(12) United States Patent
Orlando et al.

(10) Patent No.: US 7,841,165 B2
(45) Date of Patent: Nov. 30, 2010

(54) GAS TURBINE ENGINE ASSEMBLY AND METHODS OF ASSEMBLING SAME

(75) Inventors: Robert Joseph Orlando, West Chester, OH (US); Thomas Ory Moniz, Loveland, OH (US)

(73) Assignee: General Electric Company, Schenectady, NY (US)

( * ) Notice: Subject to any disclaimer, the term of this patent is extended or adjusted under 35 U.S.C. 154(b) by 887 days.

(21) Appl. No.: 11/555,042

(22) Filed: Oct. 31, 2006

(65) Prior Publication Data
US 2008/0098716 A1    May 1, 2008

(51) Int. Cl.
F02K 3/02 (2006.01)
F02K 3/072 (2006.01)

(52) U.S. Cl. .................. 60/204; 60/226.1; 60/268; 60/223

(58) Field of Classification Search ............ 60/226.1, 60/268, 39.162, 223, 204
See application file for complete search history.

(56) References Cited

U.S. PATENT DOCUMENTS

| | | | |
|---|---|---|---|
| 3,729,957 A * | 5/1973 | Petrie et al. ................ 60/268 |
| 4,827,712 A | 5/1989 | Coplin | |
| 5,274,999 A | 1/1994 | Rohra et al. | |
| 5,974,782 A * | 11/1999 | Gerez ........................ 60/223 |
| 6,240,719 B1 * | 6/2001 | Vondrell et al. ............. 60/223 |
| 6,381,948 B1 * | 5/2002 | Klingels .................... 60/226.1 |
| 6,619,030 B1 | 9/2003 | Seda et al. | |
| 6,666,017 B2 | 12/2003 | Prentice et al. | |
| 6,732,502 B2 | 5/2004 | Seda et al. | |
| 6,739,120 B2 | 5/2004 | Moniz et al. | |
| 6,763,652 B2 * | 7/2004 | Baughman et al. .......... 60/268 |
| 6,763,653 B2 | 7/2004 | Orlando et al. | |
| 6,763,654 B2 | 7/2004 | Orlando et al. | |
| 7,093,446 B2 | 8/2006 | Orlando et al. | |
| 7,096,674 B2 | 8/2006 | Orlando et al. | |
| 2004/0055276 A1 * | 3/2004 | Lewis et al. ................ 60/226.1 |
| 2005/0172610 A1 * | 8/2005 | Bart et al. .................. 60/226.1 |
| 2005/0198941 A1 * | 9/2005 | Bart et al. .................. 60/226.1 |
| 2005/0241291 A1 * | 11/2005 | Bart et al. .................. 60/226.1 |

* cited by examiner

*Primary Examiner*—Ted Kim
(74) *Attorney, Agent, or Firm*—William Scott Andes, Esq.; Armstrong Teasdale LLP

(57) ABSTRACT

A method for assembling a gas turbine engine includes coupling a low-pressure turbine to a core turbine engine, coupling a counter-rotating fan assembly including a forward fan assembly and an axially aft fan assembly to the low-pressure turbine such that the forward fan assembly rotates in a first direction and the aft fan assembly rotates in an opposite second direction, and coupling a booster compressor directly to the low-pressure turbine such that the booster compressor rotates in the first direction.

20 Claims, 5 Drawing Sheets

GAS TURBINE ENGINE ASSEMBLY AND METHODS OF ASSEMBLING SAME

BACKGROUND OF THE INVENTION

This invention relates generally to gas turbine engines, and more specifically to gas turbine engine assemblies that each include a booster compressor coupled to a low-pressure turbine and methods of assembling the same.

At least some known gas turbine engines include a fan, a core engine, and a power turbine disposed downstream from the core engine. The core engine includes at least one compressor, a combustor, a high-pressure turbine and a low-pressure turbine disposed downstream from the core engine. More specifically, the compressor and high-pressure turbine are coupled through a shaft to define a high-pressure rotor assembly. Air entering the core engine is mixed with fuel and ignited to form a high energy gas stream. The high energy gas stream flows through the high-pressure turbine to rotatably drive the high-pressure turbine such that the shaft, in turn, rotatably drives the compressor.

The gas stream expands as it flows through the low-pressure turbine to drive the fan through a second shaft. To facilitate increasing engine efficiency, at least one known gas turbine engine includes a counter-rotating low-pressure turbine that is coupled to a counter-rotating fan and a booster compressor.

An outer rotating spool, a rotating frame, a mid-turbine frame, and two concentric shafts, are installed within the gas turbine engine to facilitate supporting the counter-rotating low-pressure turbine. The installation of the aforementioned components also enables a first fan assembly to be coupled to a first turbine and a second fan assembly to be coupled to a second turbine such that the first fan assembly and the second fan assembly each rotate in the same rotational direction as the first turbine and the second turbine, respectively. However, the overall weight, design complexity and/or manufacturing costs of such an engine are increased.

BRIEF DESCRIPTION OF THE FIGURES

In one aspect, a method for assembling a gas turbine engine is provided. The method includes coupling a low-pressure turbine to a core turbine engine, coupling a counter-rotating fan assembly including a forward fan assembly and an axially aft fan assembly to the low-pressure turbine such that the forward fan assembly rotates in a first direction and the aft fan assembly rotates in an opposite second direction, and coupling a booster compressor directly to the low-pressure turbine such that the booster compressor rotates in the first direction.

In another aspect, a gas turbine engine assembly is provided. The turbine engine assembly includes a core gas turbine engine, a low-pressure turbine coupled to the core turbine engine, a counter-rotating fan assembly coupled to the low-pressure turbine, and a booster compressor coupled directly to the low-pressure turbine such that the booster compressor and the low-pressure turbine rotate in the same direction.

BRIEF DESCRIPTION OF THE DRAWINGS

Figure 1:
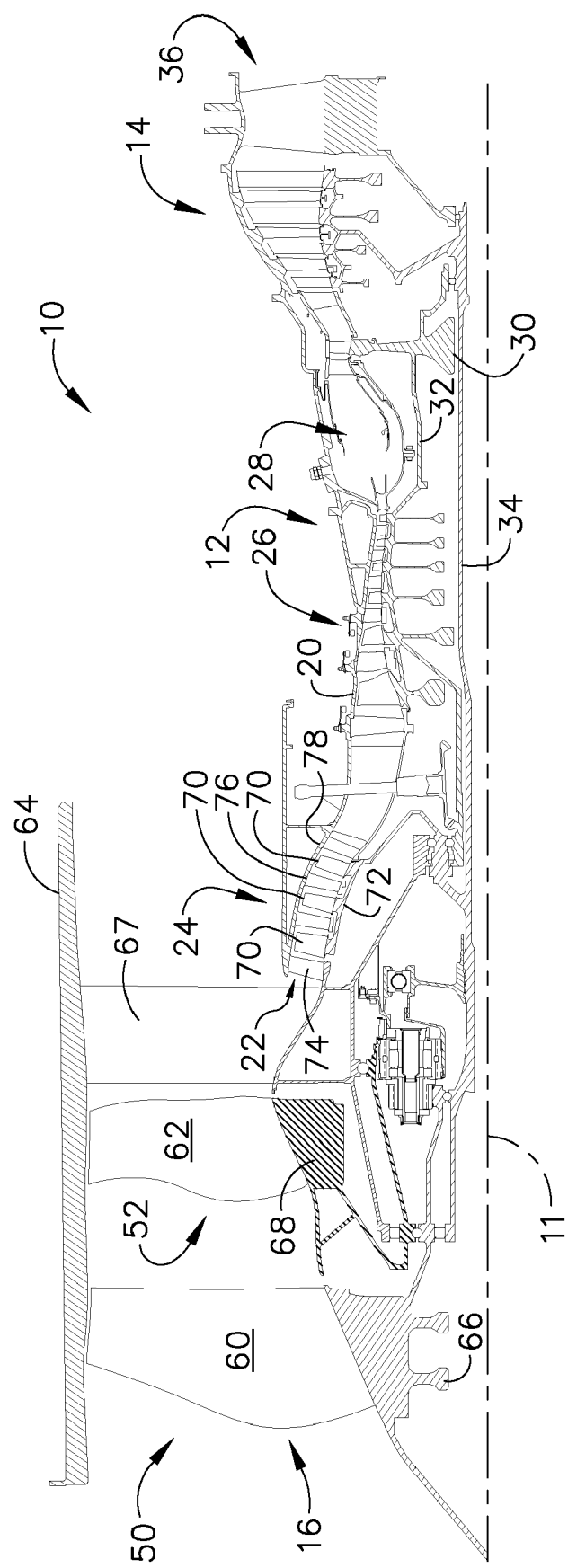
Figure 2:
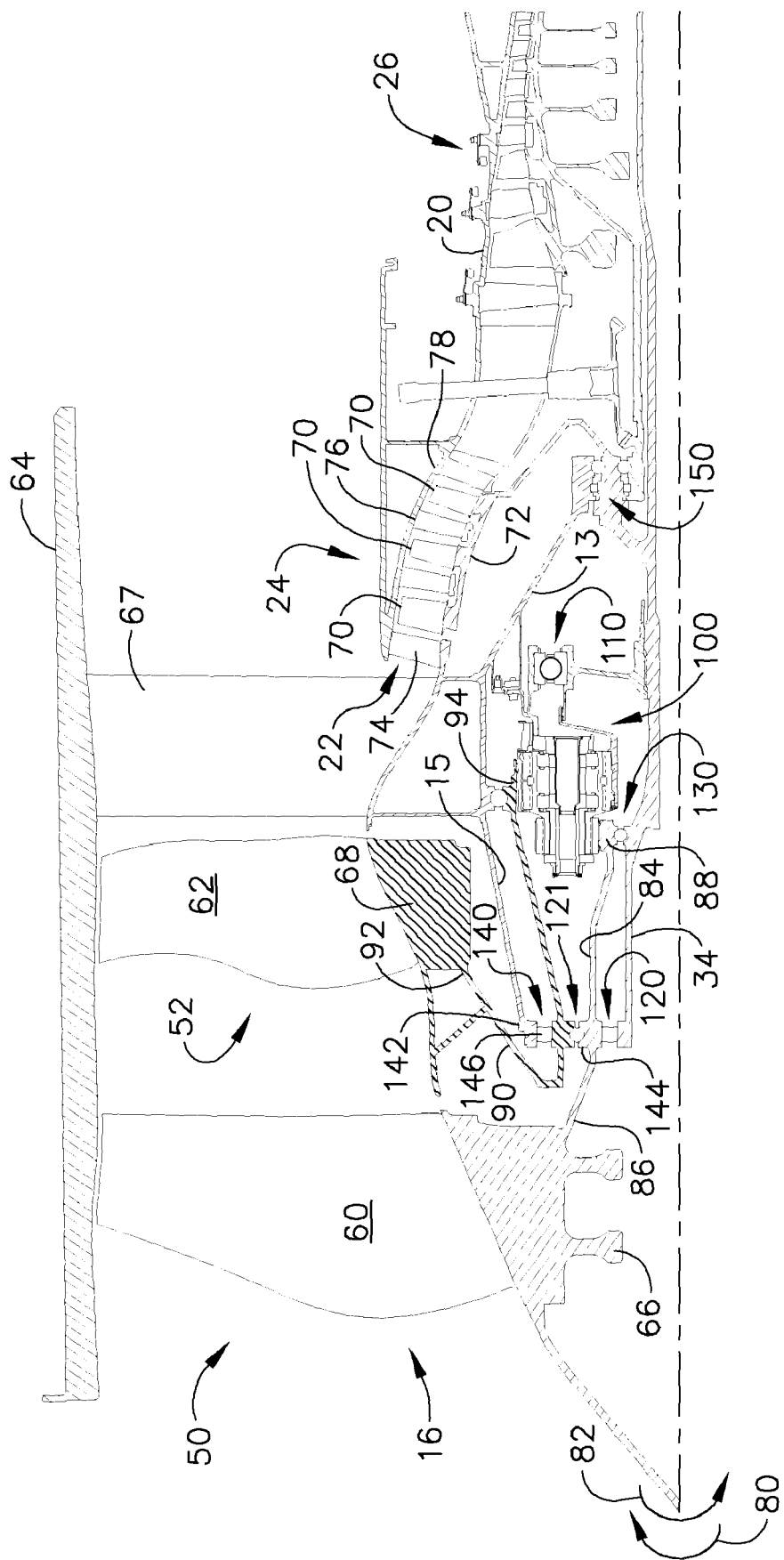
Figure 3:
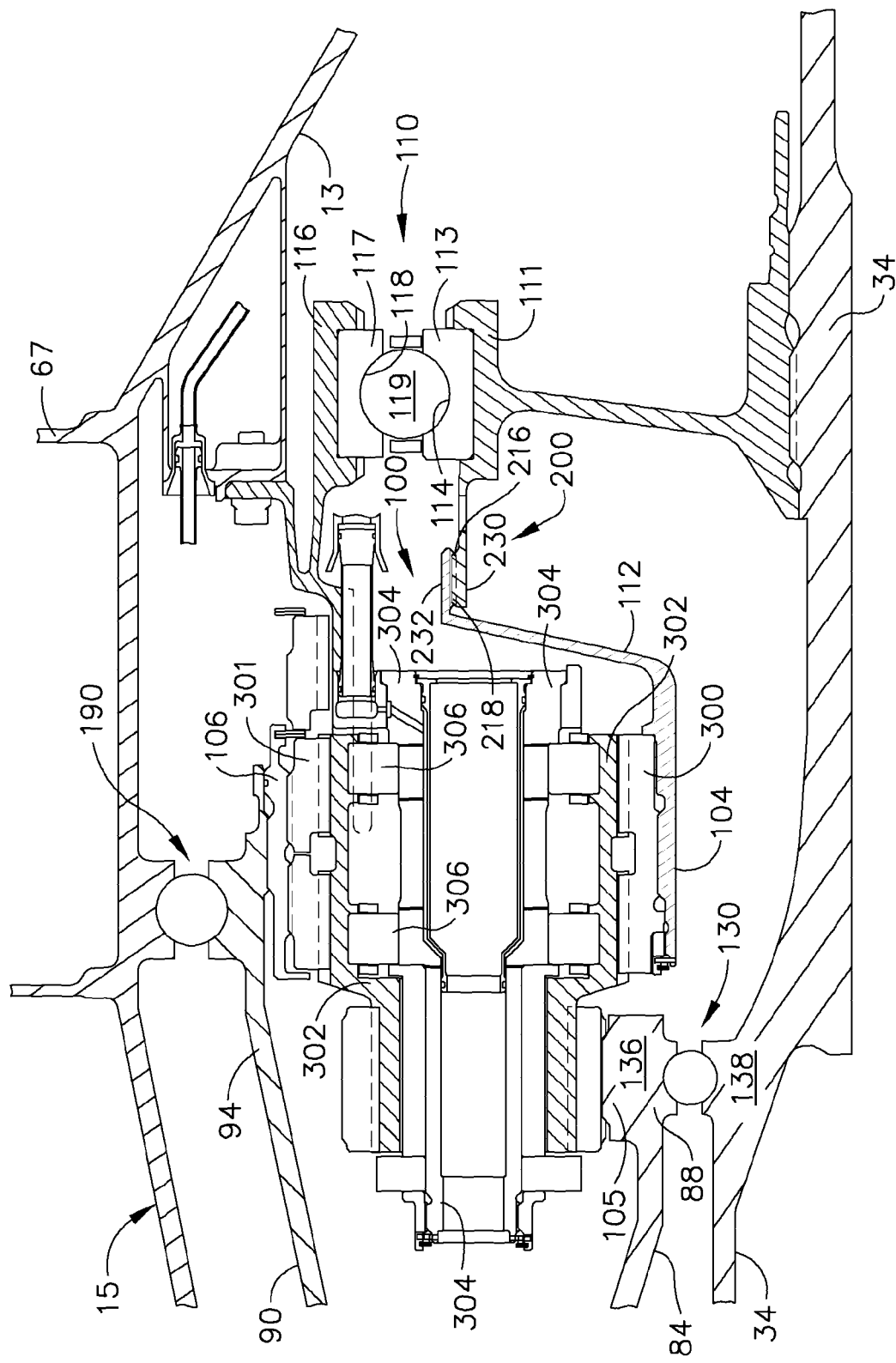
Figure 4:
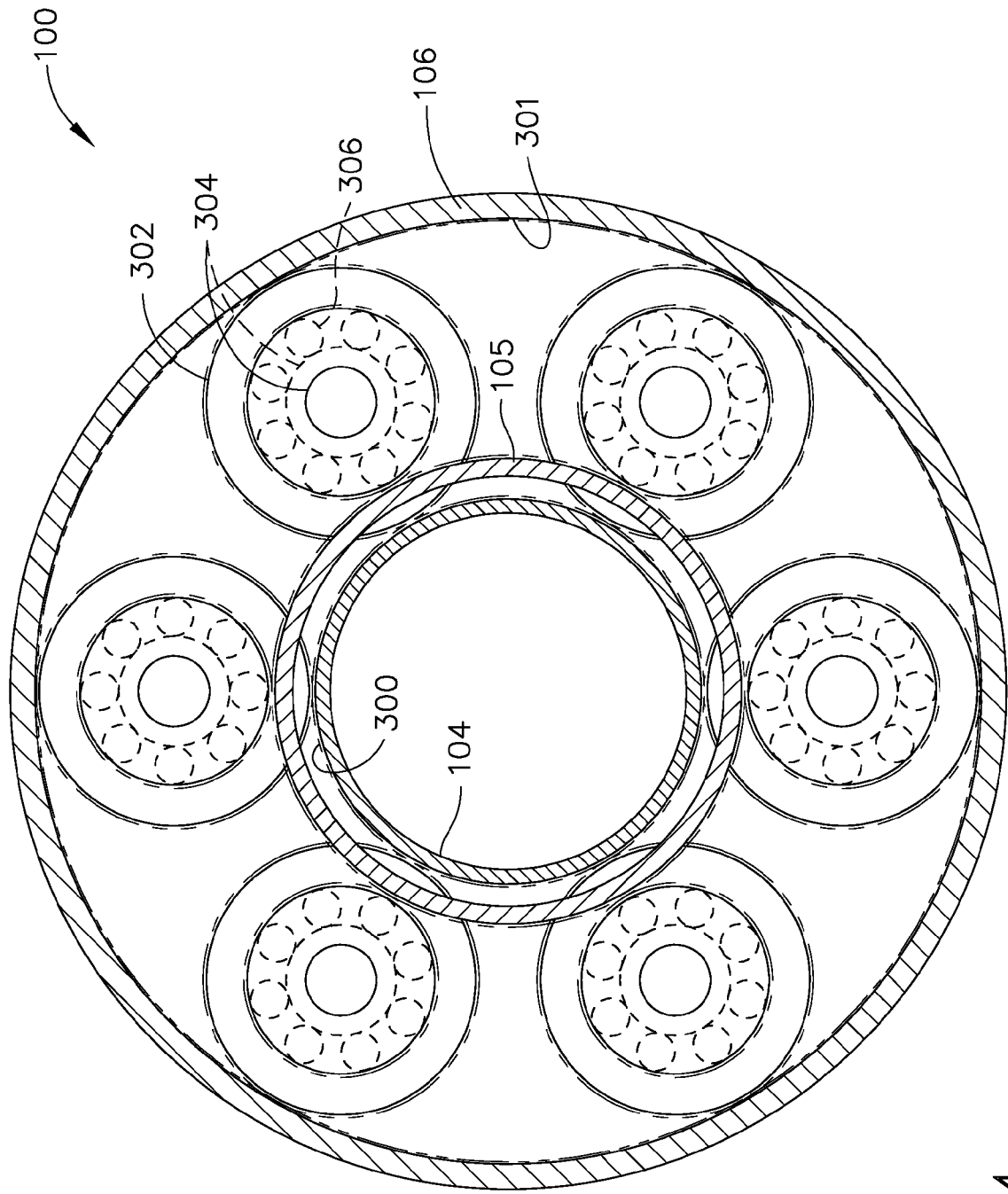

FIG. 1 is a cross-sectional view of a portion of an exemplary turbine engine assembly;

FIG. 2 is an enlarged cross-sectional view of a portion of the counter-rotating fan assembly shown in FIG. 1;

FIG. 3 is an enlarged cross-sectional view of a portion of the counter-rotating fan assembly shown in FIG. 2;

FIG. 4 is an end view of the gearbox shown in FIG. 3; and

Figure 5:
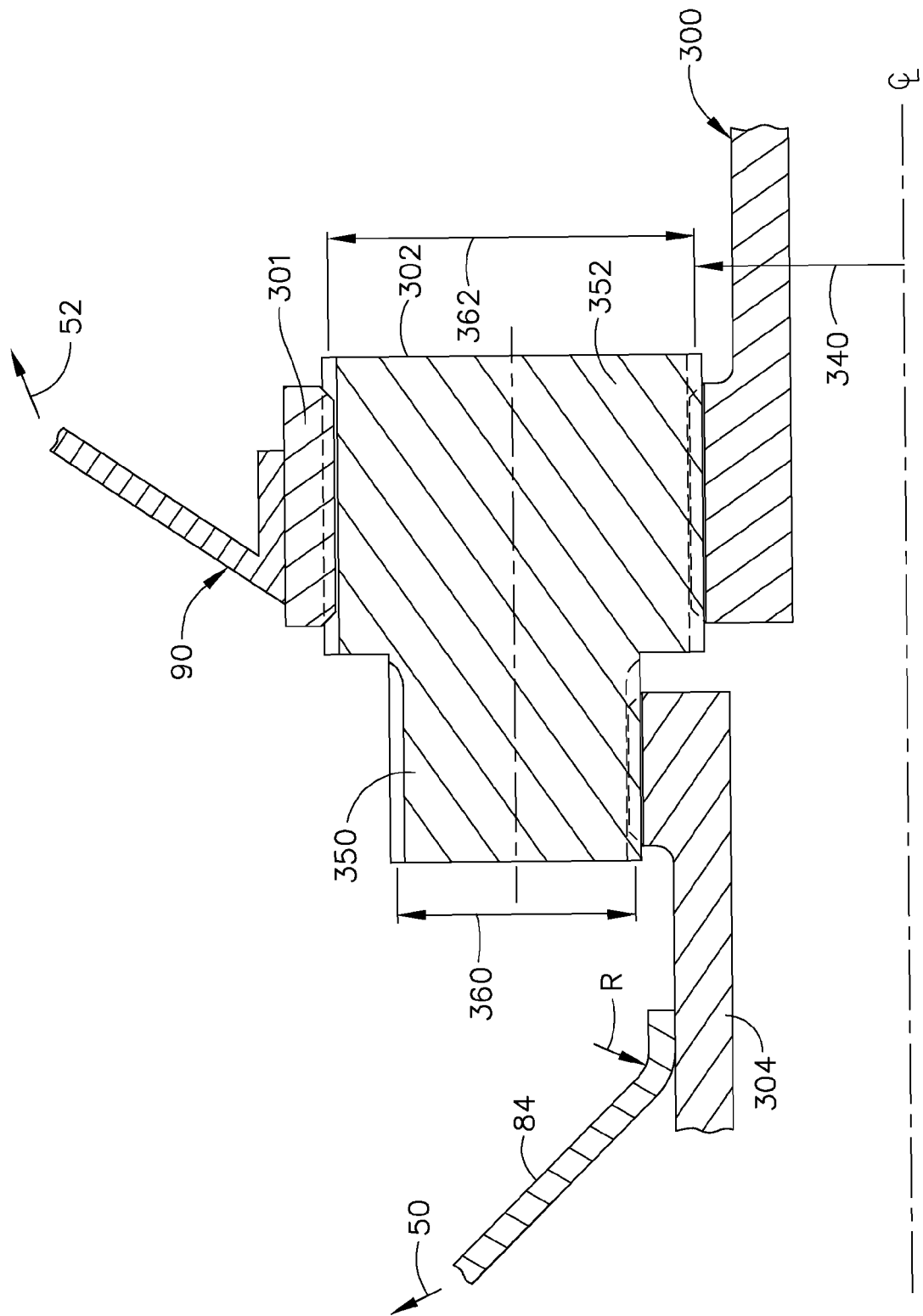

FIG. 5 is a side view of a portion of gearbox 100 shown in FIG. 4.

DETAILED DESCRIPTION OF THE INVENTION

FIG. 1 is a cross-sectional view of a portion of an exemplary turbine engine assembly 10 having a longitudinal axis 11. In the exemplary embodiment, turbine engine assembly 10 includes a core gas turbine engine 12, a low-pressure turbine 14 that is disposed axially downstream from core gas turbine engine 12, and a counter-rotating fan assembly 16 that is disposed axially upstream from core gas turbine engine 12.

Core gas turbine engine 12 includes an outer casing 20 that defines an annular core engine inlet 22. Casing 20 surrounds a low-pressure booster compressor 24 that is utilized to increase an operating pressure of the inlet air to a first pressure level. A high-pressure, multi-stage, axial-flow compressor 26 receives pressurized air from booster compressor 24 and further increases the pressure of the air to a second, higher operating pressure. The high-pressure air is channeled to a combustor 28 and is mixed with fuel. The fuel-air mixture is ignited to raise the temperature and energy level of the pressurized air. The high energy combustion products flow to a first or high-pressure turbine 30 for driving compressor 26 through a first drive shaft 32, and then to second or low-pressure turbine 14 to drive counter-rotating fan assembly 16 and booster compressor 24 through a second drive shaft 34 that is disposed coaxially inside first drive shaft 32. The exhaust stream is then discharged through an exhaust nozzle 36 to provide propulsive jet thrust.

Counter-rotating fan assembly 16 includes a first or forward fan assembly 50 and a second or aft fan assembly 52 each of which is disposed about longitudinal centerline axis 11. The terms "forward fan" and "aft fan" are used herein to indicate that fan assembly 50 is disposed axially upstream from fan assembly 52. In the exemplary embodiment, fan assemblies 50 and 52 are positioned at an upstream end of core gas turbine engine 12 as illustrated. Optionally, fan assemblies 50 and 52 are each positioned at a downstream end of core gas turbine engine 12. Fan assemblies 50 and 52 each include at least one row of rotor blades 60 and 62, respectively, and are each positioned within a nacelle 64. Blades 60 and 62 are coupled to respective rotor disks 66 and 68.

In the exemplary embodiment, booster compressor 24 includes a plurality of rows of rotor blades 70 that are coupled to a respective rotor disk 72. In the exemplary embodiment, booster compressor 24 is positioned downstream from an inlet guide vane assembly 74 and is coupled to low-pressure turbine 14 via shaft 34 which will be discussed in more detail below. Although booster compressor 24 is shown as having only three rows of rotor blades 70, it should be realized that booster compressor 24 may have a single row of rotor blades 70, or a plurality of rows of rotor blades 70 that are interdigitated with a plurality of rows of guide vanes 76.

In the exemplary embodiment, guide vanes 76 are fixedly coupled to a booster case 78. In another embodiment, guide vanes 76 are movable during engine operation to facilitate varying a quantity of air channeled through booster compressor 24. In the exemplary embodiment, booster compressor 24 is disposed axially downstream from a fan frame assembly 67 such that fan frame assembly 67 is disposed axially between booster compressor 24 and aft fan assembly 52.

FIG. 2 is an enlarged cross-sectional view of a portion of turbine engine assembly 10 shown in FIG. 1. FIG. 3 is an enlarged cross-sectional view of a portion of turbine engine assembly 10 shown in FIG. 2.

In the exemplary embodiment, first fan assembly 50 includes a cone 84 positioned about longitudinal axis 11. Cone 84 is connected at a first or forward end 86 to rotor disk 66, as shown in FIG. 2, and at a second or downstream end 88 to a first output of a gearbox 100, as shown in FIG. 3. Second fan assembly 52 includes a cone 90 positioned coaxially about at least a portion of cone 84 along longitudinal axis 11. Cone 90 is coupled at a first or forward end 92 to rotor disk 68 and at a second or downstream end 94 to a second output of gearbox 100.

As shown in FIG. 2, booster compressor 24 is directly coupled to low-pressure turbine 14 utilizing a flexible connection 150 such that booster compressor 24 rotates at the same rotational speed as low-pressure turbine 14 and in the same rotational direction.

Low-pressure turbine 14 is coupled to gearbox 100 using shaft 34 to facilitate driving or rotating forward fan assembly 50 and aft fan assembly 52 via gearbox 100. In the exemplary embodiment, forward fan assembly 50 rotates in a first rotational direction 80 and aft fan assembly 52 rotates in an opposite second direction 82. In the exemplary embodiment, gearbox 100 is a dual-output gearbox that includes an input 104 that is coupled to shaft 34, a first output 105 that is coupled to downstream end 88 of cone 84, and a second output 106 that is coupled to downstream end 94 of cone 90.

In one embodiment, a first bearing assembly 110, such as a thrust bearing assembly, is positioned about drive shaft 34 and/or longitudinal axis 11. First bearing assembly 110 operatively couples and/or is mounted between drive shaft 34 and gearbox 100. Referring further to FIG. 3, in one embodiment, thrust bearing assembly 110 includes a radially inner race 111 that is splined and/or coupled to a drive shaft extension 112 such that inner race 111 is rotatable about longitudinal axis 11 with drive shaft 34. Moreover, drive shaft extension 112 is coupled between gearbox input 104 and drive shaft 34. Inner race 111 has a surface 113 defining an inner groove 114 of thrust bearing assembly 110. Surface 113 defining inner groove 114 has a generally arcuate profile.

Thrust bearing assembly 110 includes a radially outer race 116 securely coupled to frame 13. In one embodiment, outer race 116 and/or frame 13 acts as a ground for the transfer of thrust loads and/or forces developed or generated by counter-rotating fan assembly 16. Outer race 116 has a surface 117, generally opposing surface 113, which forms an outer groove 118 of thrust bearing assembly 110. Surface 117, defining outer groove 118, has a generally arcuate profile. At least one roller element, such as a plurality of bearings 119, is movably positioned between inner race 111 and outer race 116. Each bearing 119 is in rolling contact with inner groove 114 and outer groove 118 to allow drive shaft 34 to rotate freely with respect to structure 13.

A second bearing assembly 120, such as a roller bearing assembly, is positioned radially about longitudinal axis 11. In one embodiment, roller bearing assembly 120, is positioned radially inwardly from cone 84 at or near forward end 86 and radially outwardly of shaft 34. A second bearing assembly, such as a ball bearing assembly 121 is positioned radially about longitudinal axis 11. In one embodiment, ball bearing assembly 121, is positioned radially inwardly of cone 90 at or near forward end 92 and radially outwardly of cone 84. In the exemplary embodiment, bearing assemblies 120 and 121 are bearings that function as differential bearing assemblies in combination with a fourth bearing assembly 130 to support first fan assembly 50 and/or transfer thrust loads and/or forces from first fan assembly 50 to first bearing assembly 110.

As shown in FIG. 3, fourth bearing assembly 130 is a thrust bearing that includes an outer race 136 that is coupled to cone 84 downstream end 88 and a radially inner race 138 that is coupled or splined to shaft 34. In the exemplary embodiment, bearing assembly 130 acts as a ground for the transfer of thrust loads and/or forces developed or generated by first fan assembly 50.

In one embodiment, a fifth bearing assembly, such as roller bearing assembly 140, is positioned about the outer surface of cone 90 at or near forward end 92, as shown in FIG. 2. Fifth bearing assembly 140 includes a radially outer bearing race 142 that is coupled to fan frame 67 via a support structure 15, a radially inner race 144 that is coupled to forward end 92 of cone 90, and at least one rolling element 146 that is coupled within bearing races 142 and 144. Roller bearing assembly 140 acts to support second fan assembly 52 and/or transfer radial loads and/or forces from second fan assembly 52 to fan frame 67. In the exemplary embodiment, bearing assemblies 110, 120, 121, 130 and/or 140 facilitate maintaining first fan assembly 50 and/or second fan assembly 52 in a relatively fixed axial position and also facilitate transferring thrust loads and/or forces generated by first fan assembly 50 and/or second fan assembly 52 to ground. In the exemplary embodiment, turbofan engine assembly 10 may also include a differential bearing assembly 190 that is disposed between support structure 15 and cone 90 to provide rotational support for second fan assembly 52.

FIG. 4 is an end view of gearbox 100 shown in FIG. 3. FIG. 5 is a side view of a portion of gearbox 100 shown in FIG. 4. As discussed previously herein, gearbox 100 is connected to a fixed or stationary component of gas turbine engine 10, such as frame 13 of core turbine engine 12, as shown in FIG. 3. Gearbox 100 includes input 104 that is rotatably coupled to second drive shaft 34, first output 105 that is coupled to forward fan assembly 50 via cone 84, and second output 106 that is coupled to aft fan assembly 52 via cone 90. Gearbox 100 has a substantially toroidal cross-sectional profile and substantially circumscribes drive shaft 34.

In the exemplary embodiment, gearbox 100 includes a least one first or sun gear 300 that is coupled to input 104, and a plurality of second or planetary gears 302 that are each rotatably coupled to sun gear 300. Specifically, gearbox 100 includes sun gear 300 and a set of planetary gears 302 cooperating to produce differential speeds. Accordingly, sun gear 300 is directly coupled to shaft 34, via input 104, and planetary gears 302 are disposed to intermesh with sun gear 300 and a ring gear 301 to facilitate driving aft fan assembly 52 via output 106.

More specifically, gearbox 100 includes a unitary support structure also referred to as a gorilla cage that is configured to support sun gear 300 and planetary gears 302. In the exemplary embodiment, each planetary gear 302 is coupled to the support structure utilizing a fastener 304 such as a bolt for example that facilitates securing the planetary gears 302 within the support structure. Moreover, each planetary gear 302 includes a respective bearing assembly 306 such that planetary gears 302 rotate freely with respect to sun gear 300.

In the exemplary embodiment, sun gear 300 has a diameter 340, each planetary gear 302 includes a first gear portion 350 having a first diameter 360 and a second gear portion 352 having a second diameter 362, that is greater than first diameter 360, and is coupled axially aft from first gear portion 350. In the exemplary embodiment, first and second gear portions are formed together such that each planetary gear 302 is a unitary structure. Optionally, first and second gear portions 350 and 352 are formed separately and coupled together using a fastener (not shown).

In the exemplary embodiment, sun gear diameter 340, first gear portion diameter 360 and second gear portion diameter 362 are selected based on the desired rotational speeds of first and second fan assemblies 50 and 52, respectively. For example, in one embodiment, shown in FIG. 5, sun gear 300 is meshed or drivingly coupled to second gear portion 352. Since second gear portion 352 has a diameter 362 that is greater than the diameter 360 of first gear portion 350 the rotational speeds of both forward fan assembly 50 and aft fan assembly 52 will be set at a different rotational speed. Optionally, sun gear 300 is meshed or drivingly coupled to first gear portion 350. Accordingly, during assembly, the sizes and/or diameters of each of sun gear 300, first gear portion 350 and second gear portion 352 can be varied to facilitate driving both forward and aft fan assemblies 50 and 52 at the desired rotational speeds. Additionally, since forward fan assembly 50 is rotatably coupled to first gear portion 350 and aft fan assembly 52 is rotatably coupled to second gear portion 352, and each has a different diameter, the rotational speeds of both fan assemblies are different, and can therefore be set to optimize the overall performance of the gas turbine fan assembly.

During operation, as second drive shaft 34 rotates, second drive shaft 34 causes input 104 to rotate in first rotational direction 80, which subsequently rotates sun gear 300. Since sun gear 300 is rotatably coupled to first output 105, sun gear 300 facilitates driving forward fan assembly 50, via output 105 in the same direction as drive shaft 34. Additionally, since sun gear 300 is intermeshed with planetary gears 302, rotating sun gear 300 causes planetary gears 302 to rotate and thus drive aft fan assembly 52 via ring gear 301 through second output 106 in a second direction 82 that is opposite to the rotational direction of forward fan assembly 50.

The gas turbine engine assembly described herein includes a dual output gearbox coupled between a high speed low-pressure turbine and a counter-rotating fan assembly to facilitate varying the rotational speed of one or both of the fan assemblies relative to the rotational speed of the low-pressure turbine. Moreover, the booster compressor is directly coupled to the low-pressure turbine. This configuration enables the low-pressure turbine and booster compressor to operate at relatively high speeds thus increasing overall engine efficiency with nearly axial exit velocity, which simplifies the turbine rear frame and reduces low-pressure turbine exit area for weight and cost savings. Additionally, the gear ratio for the forward fan assembly is approximately 1.7 to 1 and the gear ratio for the aft fan is approximately 2.6 to 1, to enable the aft fan to rotate at a rotational speed that is less than the rotational speed of the forward fan and thus improve overall engine efficiency. Moreover, the gear ratios of the front fan and the aft fan assemblies may be further increased to define an engine with high bypass ratio and low fan pressure to facilitate minimizing the number of low-pressure turbine stages and thus reduce overall engine noise to meet the very low noise signature requirements currently being explored by various airplane manufacturers.

As a result, the gas turbine engine assembly described herein utilizes a counter-rotating fan to increase fan efficiency, reduce fan tip speed, reduce noise, and/or reduce fan diameter compared to a single fan engine and also eliminates the bypass outlet guide vanes. Moreover, since the gas turbine engine assembly described herein does not include a counter-rotating low-pressure turbine, the mid turbine frame, the outer rotating spool, the rotating rear frame, a second low-pressure turbine shaft, and an outer rotating seal located between the outer rotating spool and the outer stationary casing may each be eliminated, thus reducing cost, weight, and design complexity. Moreover, any gear losses occurring in the configuration described herein are offset by eliminating the significant counter-rotating low-pressure turbine outer seal leakage, and contains all the major changes from a conventional engine in the front of the geared engine for easy access.

During operation, based on initial design work, the gas turbine engine assembly described herein is estimated to be substantially lighter than known counter-rotating fan engines. As a result, the gas turbine engine assembly described herein is estimated to reduce fuel consumption by approximately 1.8% from known counter-rotating fan engines. Additionally, the gas turbine engine assembly described herein may more readily meet the low noise requirements and improved fuel-burn being demanded by the airline industry.

An exemplary embodiment of a gas turbine engine assembly that includes a booster compressor directly driven from the low-pressure turbine and a gearbox coupled to a counter-rotating fan assembly and are described above in detail. The components are not limited to the specific embodiments described herein, but rather, components of each system may be utilized independently and separately from other components described herein. The gearbox described herein can also be used in combination with other known gas turbine engines that include a forward and an aft fan assembly.

In the exemplary embodiment, gas turbine engine assembly 10 also includes a fuse 200 that is approximately disk shaped and includes a radially inner portion 230 that is coupled to input 104 via splines 216 and a radially outer portion 232 that is coupled to first portion 230 via splines 218. In the exemplary embodiment, the thickness of fuse 200 is selected such that first portion 230 will separate from second portion 232, i.e. fuse 200 will break, when fuse 200 is subjected to a load and/or torque between approximately 45% and approximately 55% of the total torque load on the low-pressure turbine drive shaft.

While the invention has been described in terms of various specific embodiments, those skilled in the art will recognize that the invention can be practiced with modification within the spirit and scope of the claims.

What is claimed is:

1. A method for assembling a gas turbine engine comprising:

coupling a low-pressure turbine to a core turbine engine;

coupling a counter-rotating fan assembly including a forward fan assembly and an axially aft fan assembly to the low-pressure turbine, using a single shaft, such that the forward fan assembly rotates in a first direction and the aft fan assembly rotates in an opposite second direction; and coupling a booster compressor directly to the low-pressure turbine downstream of said a counter-rotating fan assembly such that the booster compressor rotates solely in the first direction.

2. A method in accordance with claim 1, wherein the booster compressor is positioned downstream from a fan frame assembly of the counter-rotating fan assembly.

3. A method in accordance with claim 1, further comprising:

coupling a drive shaft between the low-pressure turbine and a gearbox; and coupling the gearbox to the counter-rotating fan assembly.

4. A method in accordance with claim 3, further comprising:

coupling a first gearbox output rotating in a first direction to the forward fan assembly; and coupling a second gearbox output rotating in a second direction to the aft fan assembly.

5. A method in accordance with claim 3, further comprising:

coupling a first gearbox output to the forward fan assembly such that the forward fan assembly rotates at a first rotational speed; and coupling a second gearbox output to the aft fan assembly such that the aft fan assembly rotates at a second rotational speed that is different than the first rotational speed.

6. A method in accordance with claim 3, further comprising:

coupling a first gearbox output to the forward fan assembly such that the forward fan assembly rotates at a first rotational speed that is different than a rotational speed of the low-pressure turbine; and coupling a second gearbox output to the aft fan assembly such that the aft fan assembly rotates at a second rotational speed that is different than the first rotational speed.

7. A method in accordance with claim 1, further comprising coupling a mechanical fuse between the booster compressor and the low-pressure turbine first fan assembly and the low-pressure turbine such that the mechanical fuse fails at a predetermined moment load.

8. A gas turbine engine assembly, comprising:

a core gas turbine engine;

a low-pressure turbine coupled to said core turbine engine;

a counter-rotating fan assembly comprising a forward fan assembly and an aft fan assembly, each fan assembly drivingly coupled to said low-pressure turbine using a single shaft; and a booster compressor, downstream of the counter-rotating fan assembly, coupled directly to said low-pressure turbine such that said booster compressor and said low-pressure turbine solely rotate in the same direction.

9. A gas turbine engine assembly in accordance with claim 8, further comprising a gearbox coupled between said low-pressure turbine and said counter-rotating fan assembly.

10. A gas turbine engine assembly in accordance with claim 9 further comprising a drive shaft coupled between said low-pressure turbine and said gearbox.

11. A gas turbine engine assembly in accordance with claim 10 further comprising a gearbox coupled between said low-pressure turbine and said counter-rotating fan assembly, said gearbox having a substantially toroidal cross-sectional profile and substantially circumscribes said drive shaft.

12. A gas turbine engine assembly in accordance with claim 8 further comprising a fan frame, said booster compressor disposed downstream from said fan frame.

13. A gas turbine engine assembly in accordance with claim 8 wherein said counter-rotating fan assembly comprises a forward fan assembly configured to rotate in a first direction and an aft fan assembly configured to rotate in an opposite second direction.

14. A gas turbine engine assembly in accordance with claim 13 further comprising a gearbox, said gearbox comprising a first output coupled to said forward fan assembly and a second output coupled to said aft fan assembly.

15. A gas turbine engine assembly in accordance with claim 14 wherein said first output drives said forward fan assembly at a first rotational speed and said second output drives said aft fan at a second rotational speed that is different than the first rotational speed.

16. A gas turbine engine assembly in accordance with claim 8 further comprising coupling a flexible connection coupled between said booster compressor and said low-pressure turbine.

17. A gas turbine engine assembly in accordance with claim 8 further comprising:

a gearbox comprising a sun gear coupled to said low-pressure turbine; and a plurality of planetary gears intermeshed with said sun gear, each of said planetary gears comprising a first gear portion having a first diameter and a second gear portion having a second diameter that is different than the first diameter.

18. A gas turbine engine assembly in accordance with claim 17 wherein said counter-rotating fan assembly comprises:

a forward fan assembly coupled to said first gear portion; and an aft fan assembly coupled to said second gear portion.

19. A gas turbine engine assembly in accordance with claim 17 wherein said sun gear has a diameter that is selected based on the rotational speeds of at least one of the first fan assembly and the second fan assembly.

20. A gas turbine engine assembly in accordance with claim 17 wherein said sun gear is intermeshed only with said first gear portion.

* * * * *